United States Patent
Bao et al.

(10) Patent No.: US 12,402,111 B2
(45) Date of Patent: Aug. 26, 2025

(54) RESOURCE ALLOCATION METHOD, AND DEVICE AND STORAGE MEDIUM

(71) Applicant: ZTE CORPORATION, Shenzhen (CN)

(72) Inventors: Tong Bao, Shenzhen (CN); Yu Xin, Shenzhen (CN); Jian Hua, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 431 days.

(21) Appl. No.: 17/923,812

(22) PCT Filed: Mar. 4, 2021

(86) PCT No.: PCT/CN2021/079019
§ 371 (c)(1),
(2) Date: Nov. 7, 2022

(87) PCT Pub. No.: WO2021/223503
PCT Pub. Date: Nov. 11, 2021

(65) Prior Publication Data
US 2023/0180198 A1    Jun. 8, 2023

(30) Foreign Application Priority Data
May 8, 2020   (CN) .......................... 202010383694.7

(51) Int. Cl.
*H04W 72/0453* (2023.01)
*H04W 72/53* (2023.01)
(Continued)

(52) U.S. Cl.
CPC ....... *H04W 72/0453* (2013.01); *H04W 72/53* (2023.01); *H04L 12/5692* (2013.01); *H04L 47/70* (2013.01)

(58) Field of Classification Search
CPC ..... H04W 72/00; H04W 72/50; H04W 72/53; H04W 28/00; H04W 28/16; H04W 28/26;
(Continued)

(56) References Cited

U.S. PATENT DOCUMENTS 9,774,539 B1 * 9/2017 Jia ....................... H04L 67/1095
2008/0049851 A1 * 2/2008 Nangia ................. H04L 5/0058
375/260
(Continued)

FOREIGN PATENT DOCUMENTS

CA    2806228 A1 *  8/2013  ....... H04L 25/03834
CN    107222442 A    9/2017
(Continued)

OTHER PUBLICATIONS

International Search Report in Application No. PCT/CN2021/079019, dated Jun. 2, 2021, 4 pages including English translation.
(Continued)

*Primary Examiner* — Warner Wong
(74) *Attorney, Agent, or Firm* — MORGAN, LEWIS & BOCKIUS LLP

(57) ABSTRACT

Provided are a resource allocation method, a device, and a storage medium. The resource allocation method includes determining the number of resource blocks according to the length of a reference signal sequence, a roll-off factor of a frequency domain filter, and the number of subcarriers contained in each resource block and allocating frequency domain resources for a transmission band according to the number of resource blocks.

17 Claims, 9 Drawing Sheets

(51) Int. Cl.
*H04L 12/54* (2022.01)
*H04L 47/70* (2022.01)

(58) Field of Classification Search
CPC .............. H04W 28/0958; H04W 4/00; H04L 2012/5631; H04L 27/26412; H04L 27/26414; H04L 27/26536; H04L 27/26538
See application file for complete search history.

(56) References Cited

U.S. PATENT DOCUMENTS

| | | | |
|---|---|---|---|
| 2010/0098042 A1* | 4/2010 | Dent | H04B 1/707 370/347 |
| 2014/0003544 A1 | 1/2014 | Oketani et al. | |
| 2016/0197758 A1* | 7/2016 | Lin | H04L 27/2654 370/210 |
| 2017/0279579 A1 | 9/2017 | Qian et al. | |
| 2018/0110051 A1* | 4/2018 | Lee | H04W 28/082 |
| 2019/0356449 A1* | 11/2019 | Lee | H04W 28/082 |
| 2020/0059335 A1* | 2/2020 | Hu | H04L 5/0094 |
| 2022/0345262 A1* | 10/2022 | Liang | H04L 1/203 |

FOREIGN PATENT DOCUMENTS

| | | | |
|---|---|---|---|
| CN | 109150464 A | 1/2019 | |
| CN | 109219134 A | 1/2019 | |
| CN | 111901877 A | 11/2020 | |
| CN | 111907877 A | 11/2020 | |
| EP | 3506691 A1 * | 7/2019 | ............ H04W 64/00 |
| EP | 3627786 A1 | 3/2020 | |

OTHER PUBLICATIONS

Huawei, Hisilicon. "Performance evaluation for pi/2 BPSK with FDSS", 3GPP TSG RAN WG1 Meeting #88bis, R1-1705060, Spokane, WA, Apr. 3-7, 2017, 8 pages.

Extended European Search Report in Application No. 21800962.9, dated May 2, 2024, 7 pages.

* cited by examiner

RESOURCE ALLOCATION METHOD, AND DEVICE AND STORAGE MEDIUM

CROSS REFERENCE TO RELATED APPLICATIONS

This is a National Stage Application filed under 35 U.S.C. 371 based on International Patent Application No. PCT/CN2021/079019, filed on Mar. 4, 2021, which is based on claims priority to Chinese Patent Application No. 202010383694.7 filed with the China National Intellectual Property Administration (CNIPA) on May 8, 2020, the disclosures of which are incorporated herein by reference in their entireties.

TECHNICAL FIELD

The present application relates to the field of communication, for example, a resource allocation method, a device, and a storage medium.

BACKGROUND

Fifth generation new radio (5G NR) uplink supports a single-carrier discrete Fourier transform spread orthogonal frequency-division multiplexing (DFT-s-OFDM) waveform. The waveform supports reference signals including a demodulation reference signal (DMRS), a phase tracking reference signal (PTRS), and the like. The reference signal sequence carried by reference signals includes a Zadoff-Chu (ZC) sequence, a π/2 binary phase-shift keying (BPSK) modulation symbol, and the like. A wireless communication system estimates characteristics of a channel by relying on the reference signals, helping to cancel the distortion of signals and improving the performance of the communication system.

Compared with the wireless communication system, the transmission characteristics of high-frequency scenarios are changed. For example, the spectrum, modulation and coding, and waveform of the wireless communication system in the high-frequency scenarios are adjusted, and the reference signals supported by a new waveform and the reference signal sequence, for example, a Golay sequence, carried by the reference signals are adjusted. Therefore, how to allocate frequency domain resources in high-frequency scenarios to make the waveform more flexible is an urgent problem to be solved.

SUMMARY

The present application provides a resource allocation method, a device, and a storage medium, implementing the allocation of frequency domain resources in high-frequency scenarios.

An embodiment of the present application provides a resource allocation method. The method includes determining the number of resource blocks according to the length of a reference signal sequence, a roll-off factor of a frequency domain filter, and the number of subcarriers contained in each resource block and allocating frequency domain resources for a transmission band according to the number of resource blocks.

An embodiment of the present application provides a resource allocation apparatus. The apparatus includes a determination module and an allocator.

The determination module is configured to determine the number of resource blocks according to the length of a reference signal sequence, a roll-off factor of a frequency domain filter, and the number of subcarriers contained in each resource block. The allocator is configured to allocate frequency domain resources for a transmission band according to the number of resource blocks.

An embodiment of the present application provides a device. The device includes a communication module, a memory, and one or more processors. The communication module is configured to perform communication interaction between at least two communication nodes. The memory is configured to store one or more programs. When executed by the one or more processors, the one or more programs cause the one or more processors to implement the preceding resource allocation method according to any embodiment.

An embodiment of the present application provides a storage medium storing a computer program which, when executed by a processor, implements the preceding resource allocation method according to any embodiment.

DETAILED DESCRIPTION

Embodiments of the present application are described below in conjunction with drawings.

Figure 1:
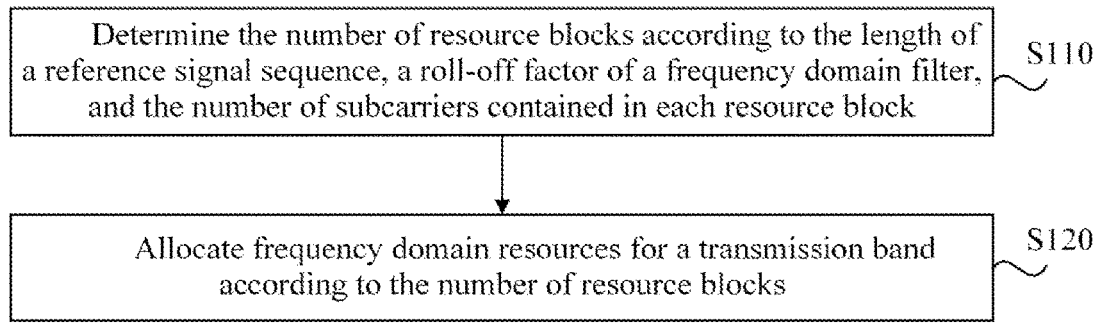
FIG. 1 is a flowchart of a resource allocation method according to an embodiment of the present application.

FIG. 1 is a flowchart of a resource allocation method according to an embodiment of the present application. This embodiment may be executed by a terminal side (for example, a user equipment) or a network side (for example, a base station). As shown in FIG. 1, this embodiment includes S110 and S120.

In S110, the number of resource blocks is determined according to the length of a reference signal sequence, a roll-off factor of a frequency domain filter, and the number of subcarriers contained in each resource block.

In S120, frequency domain resources are allocated for a transmission band according to the number of resource blocks.

In this embodiment, in the long-term evolution (LTE) and a 5G NR communication system, both user resource allocation and resource scheduling are in units of resource blocks (RB). One resource block includes 12 consecutive subcarriers, that is, the number of subcarriers contained in each resource block is 12. In this embodiment, the reference signal sequence may be transmitted on the time domain resources of the transmission band. In this embodiment, the transmission band may be the entire transmission band or a sub-band in the channel bandwidth in the communication system. In this embodiment, the number of resource blocks is determined according to the length of the reference signal sequence, the roll-off factor of the frequency domain filter, and the number of subcarriers contained in each resource block. The frequency domain resources are allocated for the transmission band according to the number of resource blocks so that mapping of physical transmission resources can be facilitated, and users can flexibly schedule physical resources. After allocating frequency domain resources for the transmission band, the frequency domain resources allocated by the transmission band may be allocated to users so that data of users is transmitted in the frequency domain resources allocated by the transmission band. In this embodiment, the length of the reference signal sequence satisfies the power of 2 or is another integer.

In an embodiment, the transmission band includes a reference signal block and a data block. The reference signal block and the data block are allocated the same number of resource blocks. The reference signal sequence is transmitted on the reference signal block or time domain resources of the transmission band. The transmission band is the entire transmission band or a sub-band in channel bandwidth in a communication system.

In an embodiment, the manner for determining the number of resource blocks also includes determining the number of resource blocks according to the length of a data block, the roll-off factor of the frequency domain filter, and the number of subcarriers contained in each resource block. In this embodiment, the length (that is, the number of modulation symbols contained in a data block) of one data block (or orthogonal frequency-division multiplexing (OFDM) symbol) may be the same as the length of the reference signal sequence. In this embodiment, frequency domain resources may be allocated for a transmission band according to the length of a data block, facilitating to mapping of physical transmission resources and flexible scheduling of physical resources by users.

In an embodiment, the length of a data block includes the length of a data constellation modulation symbol and the length of a reference signal modulation symbol. The length of the data block is equal to the sum of the length of the data constellation modulation symbol and the length of the reference signal modulation symbol. The length of the data constellation modulation symbol is less than or equal to the length of the data block and is greater than or equal to zero. The length of the reference signal modulation symbol is less than or equal to the length of the data block and is greater than or equal to zero. In this embodiment, assuming that the length of the data block is N, the length of the data constellation modulation symbol is M, and the length of the reference signal modulation symbol is S, the relationship of N=M+S is satisfied. 0=<M<=N, and 0=<S<=N. When M=0, N=S. That is, the data block contains only the reference signal modulation symbol, that is, the data block is a reference signal block or a reference signal OFDM symbol. When S=0, N=M. That is, the data block contains only the data constellation modulation symbol and does not contain the reference signal modulation symbol. When M>0 and S>0, that is, the data block not only contains the data constellation modulation symbol, but also is inserted with the reference signal modulation symbol.

In an embodiment, the number of resource blocks satisfies the following formula:

$$N_{grid}^{size}=N \cdot (1+\alpha)/N_{SC}^{RB}.$$

$N_{grid}^{size}$ denotes the number of resource blocks. $N_{SC}^{RB}$ denotes the number of subcarriers contained in each resource block. N denotes the length of the reference signal sequence. α denotes the roll-off factor of the frequency domain filter, and $0 \le \alpha \le 1$.

In an embodiment, the transmission band uses single-carrier type waveform modulation.

In an embodiment, the single-carrier type waveform modulation includes a discrete Fourier transform (DFT) operation or a fast Fourier transform (FFT) operation.

In an embodiment, the single-carrier type waveform modulation includes discrete Fourier transform spread orthogonal frequency-division multiplexing (DFT-s-OFDM) waveform modulation or single-carrier frequency-division multiple access (SC-FDMA) waveform modulation.

In an embodiment, allocating frequency domain resources for the transmission band according to the number of resource blocks includes, in the case where the number of resource blocks is an integer, allocating a first preset number of subcarriers for the transmission band. The first preset number is the product value of the number of resource blocks and the number of subcarriers contained in each resource block. In this embodiment, the first preset number is $N_{grid}^{size} N_{SC}^{RB}$.

In an embodiment, allocating frequency domain resources for the transmission band according to the number of resource blocks includes the following processes.

In the case where the number of resource blocks is a non-integer, a second preset number of subcarriers or a third preset number of subcarriers for the transmission band is allocated. The second preset number is the product value of the ceiling value of the number of resource blocks and the number of subcarriers contained in each resource block. The third preset number is the product value of the floor value of the number of resource blocks and the number of subcarriers contained in each resource block. In this embodiment, in the case where the number of resource blocks is a non-integer, the second preset number $\lceil N_{grid}^{size} \rceil N_{SC}^{RB}$ (that is, the product value of the ceiling value of the number of resource blocks and the number of subcarriers contained in each resource block) of subcarriers or the third preset number $\lfloor N_{grid}^{size} \rfloor N_{SC}^{RB}$ (that is, the product value of the floor value of the number of resource blocks and the number of subcarriers contained in each resource block) of subcarriers may be allocated for the transmission band. $\lceil \ \rceil$ is a ceiling operation. $\lfloor \ \rfloor$ is a floor operation.

In an embodiment, in the case where the number of resource blocks is a non-integer, the resource allocation method also includes configuring a first threshold value. The first threshold value is configured to determine whether to perform a ceiling operation or a floor operation on the number of resource blocks. The first threshold value is related to the modulation order of a data constellation modulation symbol. In an actual resource allocation process, the number of resource blocks may be an integer or a non-integer. When the number of resource blocks is a non-integer, a first threshold value T configured to determine whether to perform a ceiling operation or a floor operation on the number of resource blocks may be set to flexibly allocate frequency domain resources to users. In this embodiment, the first threshold value is related to the modulation order of the data constellation modulation symbol. That is, when the modulation order of the data constellation modulation symbol is relatively high, the user interference is relatively large. The first threshold value T configured to determine whether to perform a ceiling operation or a floor operation on the number of resource blocks may be set to be larger, and the number of resource blocks is performed a ceiling operation so that guard subcarriers reduce interference between users. When the modulation order of the data constellation modulation symbol is relatively low, the user interference is relatively small. The first threshold value T configured to determine whether to perform a ceiling operation or a floor operation on the number of resource blocks may be set to be smaller. The number of resource blocks is performed a floor operation to improve the utilization rate of physical resources.

In an embodiment, in the case where a fourth preset number is less than or equal to the first threshold value, the second preset number of subcarriers are allocated for the transmission band. In the case where the fourth preset number is greater than the first threshold value, the third preset number of subcarriers are allocated for the transmission band. The fourth preset number is the difference between the ceiling value of the number of resource blocks and the number of resource blocks. In this embodiment, the fourth preset number is $\lceil N_{grid}^{size} \rceil - N_{grid}^{size}$. In the case of $\lceil N_{grid}^{size} \rceil - N_{grid}^{size} \leq T$, $\lceil N_{grid}^{size} \rceil N_{SC}^{RB}$ subcarriers are allocated for the transmission band. In the case of $\lceil N_{grid}^{size} \rceil - N_{grid}^{size} > T$, $\lfloor N_{grid}^{size} \rfloor N_{SC}^{RB}$ subcarriers are allocated for the transmission band.

In an embodiment, in the case where the second preset number of subcarriers are allocated for the transmission band and the resource length of the second preset number of subcarriers is greater than a first value, the part of the second preset number of subcarriers whose resource length is greater than the first value are set as guard subcarriers. The first value is a value determined according to the length of the reference signal sequence and the roll-off factor of the frequency domain filter. In this embodiment, assuming that the length of the reference signal sequence is N and the roll-off factor of the frequency domain filter is $\alpha$, the first value may be $N \cdot (1+\alpha)$. In this embodiment, in the case where the resource length of the second preset number $\lceil N_{grid}^{size} \rceil N_{SC}^{RB}$ of subcarriers is greater than $N \cdot (1+\alpha)$, the part of $\lceil N_{grid}^{size} \rceil N_{SC}^{RB}$ subcarriers whose resource length is greater than $N \cdot (1+\alpha)$ or all subcarriers are set as guard subcarriers, thereby reducing interference between users.

In an embodiment, in the case where the third preset number of subcarriers is allocated for the transmission band and the resource length of the third preset number of subcarriers is less than a first value, the resource length that is greater than the third preset number of subcarriers in frequency domain of the transmission band is removed or zeroed. In this embodiment, in the case where the resource length of the third preset number $\lfloor N_{grid}^{size} \rfloor N_{SC}^{RB}$ of subcarriers is less than $N \cdot (1+\alpha)$, the signals in the frequency domain of the transmission band that are greater than the resource length of $\lceil N_{grid}^{size} \rceil N_{SC}^{RB}$ subcarriers are directly truncated or zeroed, thereby improving the utilization rate of physical resources and reducing interference between users.

In an embodiment, in the case where the third preset number of subcarriers is allocated for the transmission band and the resource length of the third preset number of subcarriers is less than a first value, signals of the transmission band in frequency domain partially overlap signals of an adjacent transmission band. In this embodiment, in the case where the resource length of the third preset number $\lfloor N_{grid}^{size} \rfloor N_{SC}^{RB}$ of subcarriers is less than $N \cdot (1+\alpha)$, signals of the transmission band in frequency domain may partially overlap signals of an adjacent transmission band. In this manner, the advantage is to improve the utilization rate of physical resources and reduce the interference between users.

Figure 2:
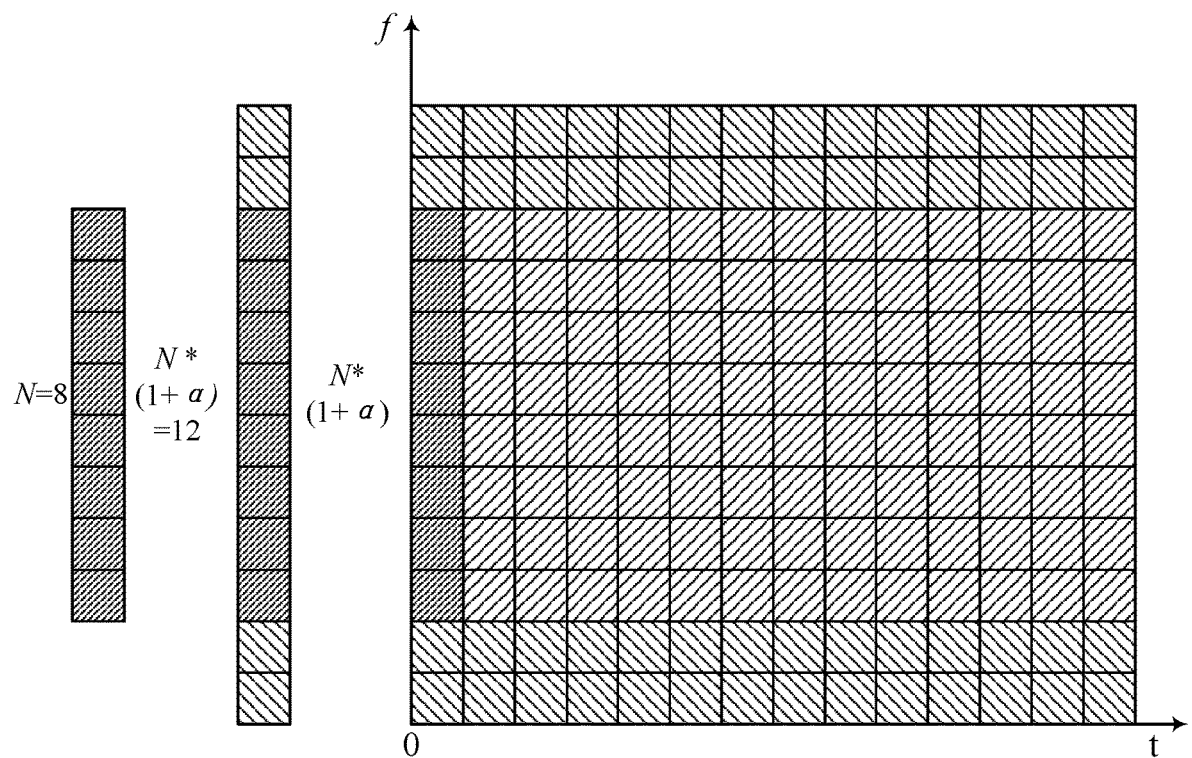
FIG. 2 is a diagram of allocation of frequency domain resources according to an embodiment of the present application.

In an embodiment, FIG. 2 is a diagram of allocation of frequency domain resources according to an embodiment of the present application. As shown in FIG. 2, assuming that the length of a reference signal sequence is N (N=8) and a roll-off factor of a frequency domain filter is $\alpha$=5, frequency domain resources can be allocated for a transmission band through $N_{grid}^{size} = N \cdot 1+\alpha)/N_{SC}^{RB}$.

$N_{grid}^{size}$ denotes the number of resource blocks. $N_{SC}^{RB}$ denotes the number of subcarriers contained in each resource block. In this embodiment, the reference signal sequence is transmitted on the transmission band. A resource block contains 12 consecutive subcarriers in the frequency domain, that is, $N_{SC}^{RB}=12$.

In this embodiment, the number of resource blocks can be calculated as $N_{grid}^{size}=1$, that is, $N_{grid}^{size}$ is an integer. $N_{grid}^{size}N_{SC}^{RB}=12$ subcarriers are allocated for the transmission band. The transmission band contains a reference signal block and a data block. The reference signal block and the data block are allocated the same number of resource blocks.

The frequency domain resources of the transmission band include $N_{grid}^{size}N_{SC}^{RB}$ subcarriers and $N_{symb}^{subframe}$ (for example, $N_{symb}^{subframe}=14$) OFDM symbols. The reference signal block occupies the first OFDM symbol (in other embodiments, the reference signal block may occupy other OFDM symbols). The data block occupies the second to fourteenth OFDM symbols. The frequency domain resources allocated by the transmission band are allocated to users. The data of users is transmitted in the frequency domain resources allocated by the transmission band.

Figure 3:
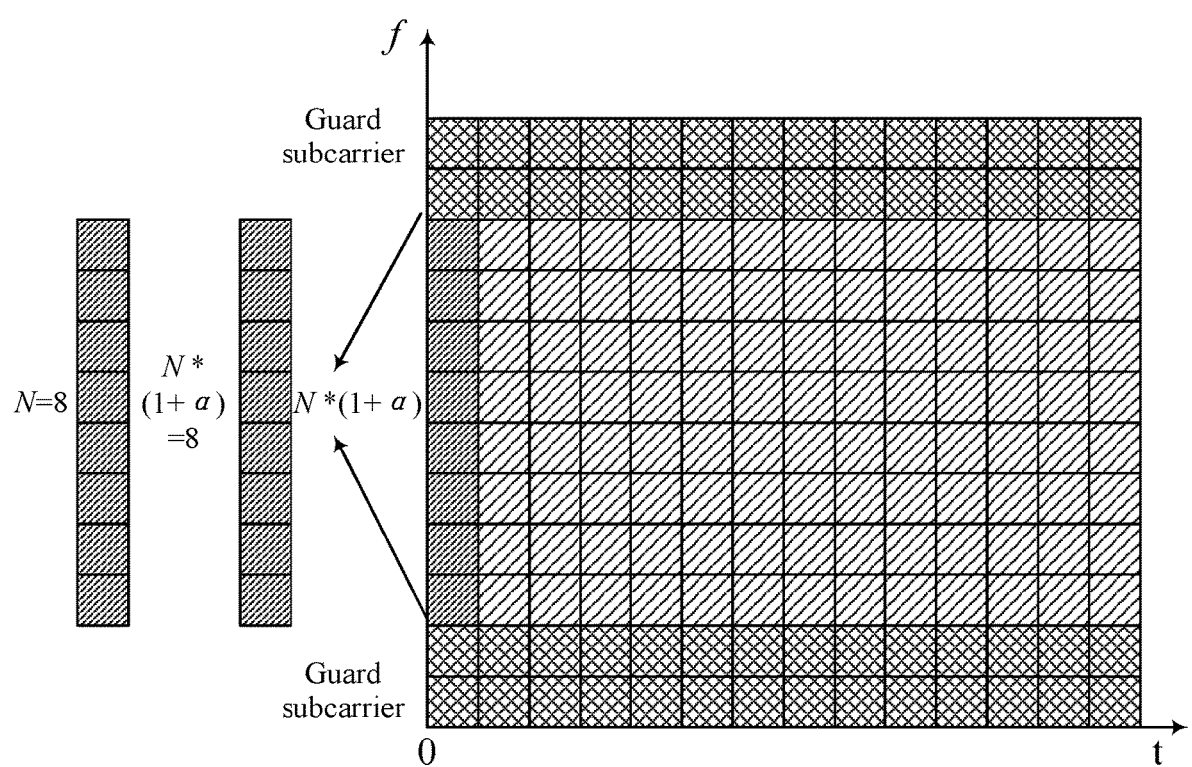
FIG. 3 is another diagram of allocation of frequency domain resources according to an embodiment of the present application.

In an embodiment, FIG. 3 is another diagram of allocation of frequency domain resources according to an embodiment of the present application. As shown in FIG. 3, assuming that the length of a reference signal sequence is N (N=8) and a roll-off factor of a frequency domain filter is $\alpha$=0, frequency domain resources can be allocated for a transmission band through $N_{grid}^{size}=N \cdot (1+\alpha)/N_{SC}^{RB}$.

$N_{grid}^{size}$ denotes the number of resource blocks. $N_{SC}^{RB}$ denotes the number of subcarriers contained in each resource block. In this embodiment, the reference signal sequence is transmitted on the transmission band. A resource block contains 12 consecutive subcarriers in the frequency domain, that is, $N_{SC}^{RB}R=12$.

In this embodiment, the number of resource blocks can be calculated as $N_{grid}^{size}=2/3$, that is $N_{grid}^{size}$ is a non-integer. Assuming that a first threshold value T for determining whether the number of resource blocks is performed a ceiling operation or a floor operation is set to be 0.5 and $\lceil N_{grid}^{size} \rceil - N_{grid}^{size} \leq T$ is satisfied, the transmission band allocates $\lceil N_{grid}^{size} \rceil N_{SC}^{RB}=12$ subcarriers. In this embodiment, the resource length of $\lceil N_{grid}^{size} \rceil N_{SC}^{RB}=12$ subcarriers is greater than $N \cdot (1+\alpha)=8$, and the part of $\lceil N_{grid}^{size} \rceil N_{SC}^{RB}$ subcarriers whose resource length is greater than $N \cdot (1+\alpha)$ are set as guard subcarriers. That is, the reference signal block and the data block occupy the second to the ninth subcarriers of the frequency domain resources allocated by the transmission band. The zeroth subcarrier and the first subcarrier at the left edge of the frequency domain resources allocated by the transmission band are set as guard subcarriers. The tenth subcarrier and the eleventh subcarrier at the right edge of the frequency domain resources allocated by the transmission band are set as guard subcarriers. The frequency domain resources on the transmission band include $N_{symb}^{subframe}=14$ OFDM symbols. The reference signal block occupies the first OFDM symbol. The data block occupies the second to fourteenth OFDM symbols.

Figure 4:
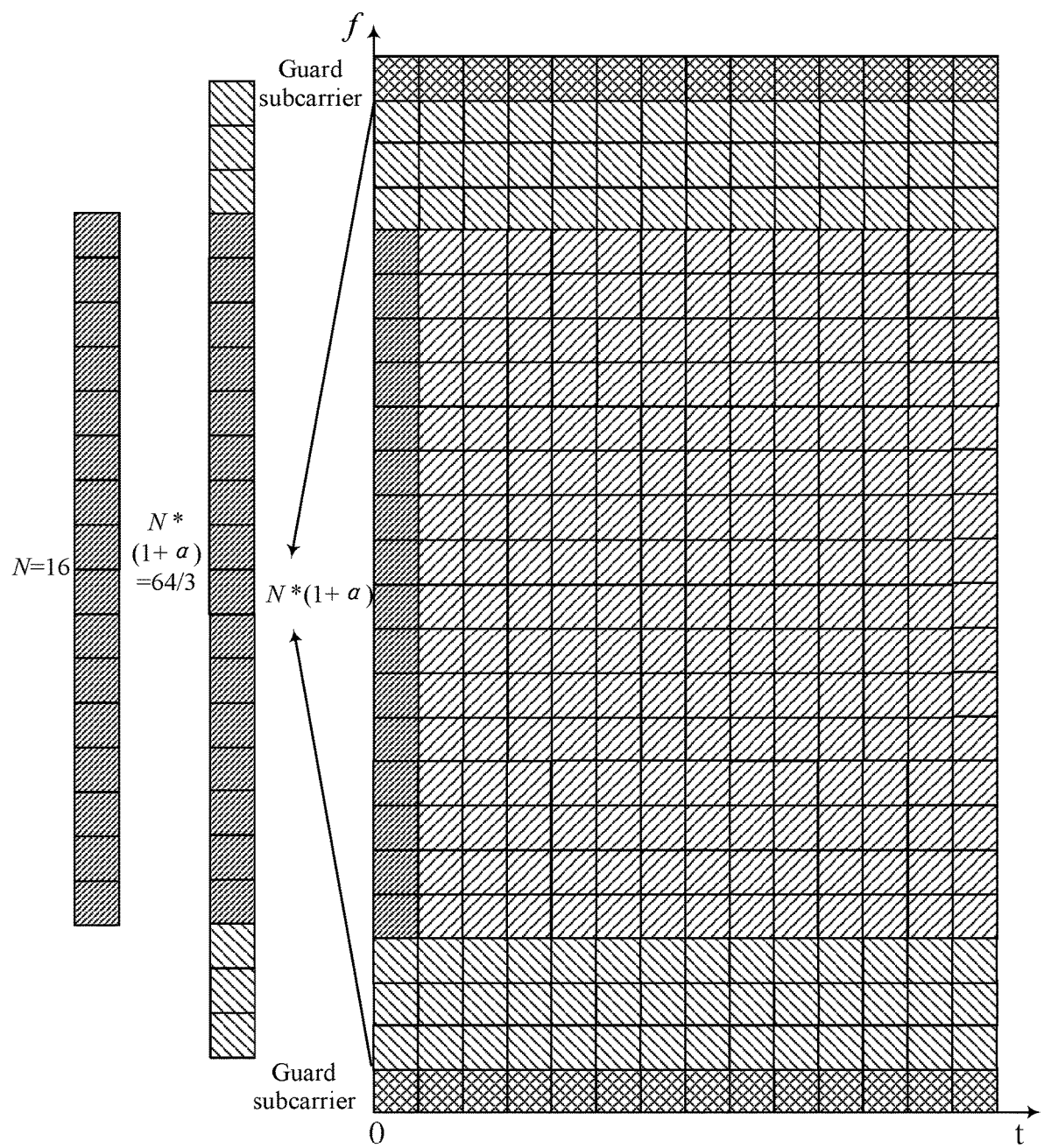
FIG. 4 is another diagram of allocation of frequency domain resources according to an embodiment of the present application.

In an embodiment, FIG. 4 is another diagram of allocation of frequency domain resources according to an embodiment of the present application. As shown in FIG. 4, assuming that the length of a reference signal sequence is N (N=16) and a roll-off factor of a frequency domain filter is $\alpha=\frac{1}{3}$, frequency domain resources can be allocated for a transmission band through $N_{grid}^{size}=N\cdot(1+\alpha)/N_{SC}^{RB}$.

$N_{grid}^{size}$ denotes the number of resource blocks. $N_{grid}^{size}$ denotes the number of subcarriers contained in each resource block. In this embodiment, the reference signal sequence may be transmitted on the transmission band. A resource block contains 12 consecutive subcarriers in the frequency domain, that is, $N_{SC}^{RB}=12$.

In this embodiment, the number of resource blocks can be calculated as $N_{grid}^{size}=16/9$, that is, $N_{grid}^{size}$ is a non-integer. A first threshold value T for determining whether the number of resource blocks is performed a ceiling or floor operation is set to be $\frac{1}{3}$ and $\lceil N_{grid}^{size}\rceil-N_{grid}^{size}\leq T$ is satisfied, the transmission band allocates $\lceil N_{grid}^{size}\rceil N_{SC}^{RB}=24$ subcarriers. In this embodiment, the resource length of $\lceil N_{grid}^{size}\rceil N_{SC}^{RB}=24$ subcarriers is greater than $N\cdot(1+\alpha)=64/3$, and the part of $\lceil N_{grid}^{size}\rceil N_{SC}^{RB}$ subcarriers whose resource length is greater than $N\cdot(1+\alpha)$ are set as guard subcarriers. That is, the reference signal block and the data block occupy the first to the twenty-second subcarriers of the frequency domain resources allocated by the transmission band. The zeroth subcarrier at the left edge of the frequency domain resources allocated by the transmission band is set as a guard subcarrier. The twenty-third subcarrier at the right edge of the frequency domain resources allocated by the transmission band is set as a guard subcarrier. The frequency domain resources on the transmission band include $N_{symb}^{subframe}=14$ OFDM symbols. The reference signal block occupies the first OFDM symbol. The data block occupies the second to fourteenth OFDM symbols. In this embodiment, to ensure that adjacent users are subjected to the same interference, the subcarriers of frequency domain resources set as the guard subcarriers may be symmetrical.

Figure 5:
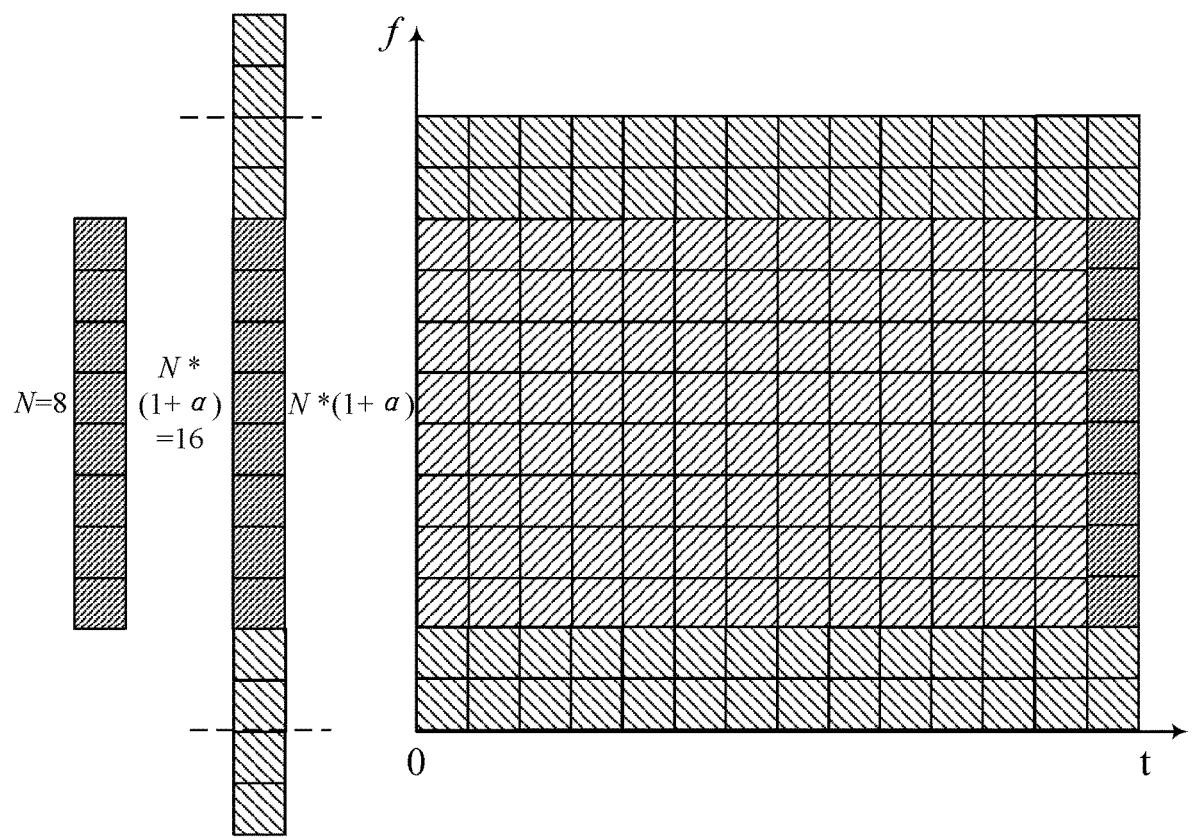
FIG. 5 is another diagram of allocation of frequency domain resources according to an embodiment of the present application.

In an embodiment, FIG. 5 is another diagram of allocation of frequency domain resources according to an embodiment of the present application. As shown in FIG. 5, assuming that the length of a reference signal sequence is N (N=8) and a roll-off factor of a frequency domain filter is $\alpha=1$, frequency domain resources can be allocated for a transmission band through $N_{grid}^{size}=N\cdot(1+\alpha)/N_{SC}^{RB}$.

$N_{grid}^{size}$ denotes the number of resource blocks. $N_{SC}^{RB}$ denotes the number of subcarriers contained in each resource block. In this embodiment, the reference signal sequence is transmitted on the transmission band. A resource block contains 12 consecutive subcarriers in the frequency domain, that is, $N_{SC}^{RB}=12$.

In this embodiment, the number of resource blocks is $N_{grid}^{size}=4/3$, that is, $N_{grid}^{size}$ is a non-integer. In this embodiment, the modulation order of a data constellation modulation symbol is quadrature phase-shift keying (QPSK), the value of a first threshold value T (T=0.1) for determining whether the number of resource blocks is performed a ceiling operation or a floor operation is set to be smaller, and $\lceil N_{grid}^{size}\rceil-N_{grid}^{size}>T$ is satisfied so that the transmission band allocates $\lfloor N_{grid}^{size}\rfloor N_{SC}^{RB}=12$ subcarriers. In this embodiment, the resource length of $\lfloor N_{grid}^{size}\rfloor N_{SC}^{RB}$ subcarriers is less than $N\cdot(1+\alpha)$, the signals in the frequency domain of the transmission band that are greater than the resource length of $\lceil N_{grid}^{size}\rceil-N_{grid}^{size}$ subcarriers are directly truncated (that is, the same effect as zeroing). The frequency domain resources on the transmission band include $N_{symb}^{subframe}=14$ OFDM symbols. The reference signal block occupies the fourteenth OFDM symbol. The data block occupies the first to thirteenth OFDM symbols.

Figure 6:
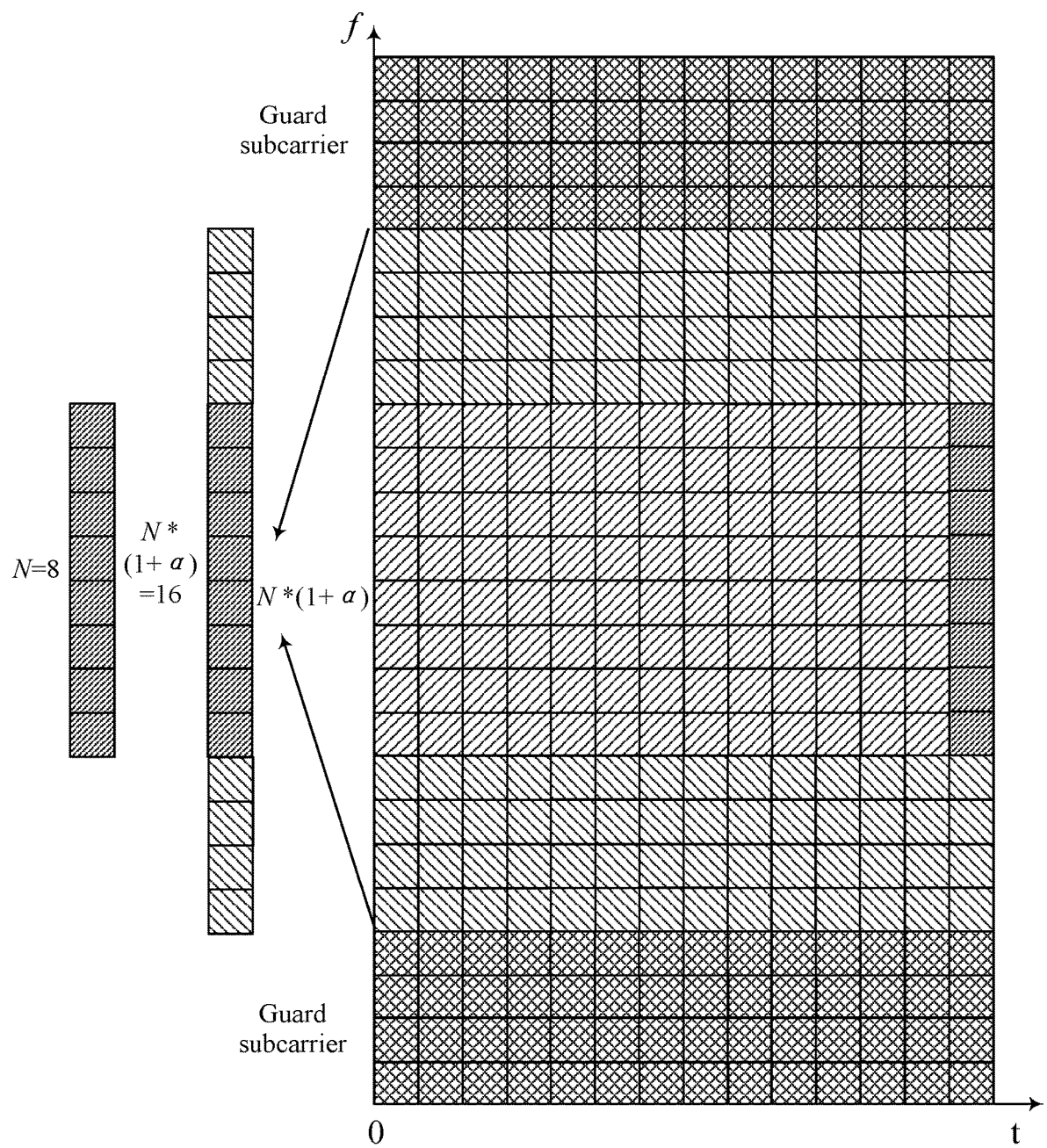
FIG. 6 is another diagram of allocation of frequency domain resources according to an embodiment of the present application.

In an embodiment, FIG. 6 is another diagram of allocation of frequency domain resources according to an embodiment of the present application. As shown in FIG. 6, assuming that the length of a reference signal sequence is N (N=8) and a roll-off factor of a frequency domain filter is $\alpha=1$ frequency domain resources can be allocated for a transmission band through $N_{grid}^{size}=N\cdot(1+\alpha)/N_{SC}^{RB}$.

$N_{grid}^{size}$ denotes the number of resource blocks. $N_{SC}^{RB}$ denotes the number of subcarriers contained in each resource block. In this embodiment, the reference signal sequence is transmitted on the transmission band. A resource block contains 12 consecutive subcarriers in the frequency domain, that is, $N_{SC}^{RB}=12$.

In this embodiment, the number of resource blocks can be calculated as $N_{grid}^{size}=4/3$, that is, $N_{grid}^{size}$ is a non-integer. In this embodiment, the modulation order of a data constellation modulation symbol is 1024 quadrature amplitude modulation (QAM), the value of a first threshold value T (T=0.9) for determining whether the number of resource blocks is performed a ceiling operation or a floor operation is set to be larger, and $\lceil N_{grid}^{size}\rceil-N_{grid}^{size}\leq T$ is satisfied so that the transmission band allocates $\lfloor N_{grid}^{size}\rfloor N_{SC}^{RB}=24$ subcarriers. In this embodiment, the resource length of $\lceil N_{grid}^{size}\rceil N_{SC}^{RB}$ subcarriers is greater than $N\cdot(1+\alpha)$, and the part of $\lceil N_{grid}^{size}\rceil N_{SC}^{RB}$ subcarriers whose resource length is greater than $N\cdot(1+\alpha)$ are set as guard subcarriers. That is, the reference signal block and the data block occupy the fourth to the nineteenth subcarriers of the frequency domain resources allocated by the transmission band. The zeroth to the third subcarriers at the left edge of the frequency domain resources allocated by the transmission band are set as guard subcarriers. The twentieth to the twenty-third subcarriers at the right edge of the frequency domain resources allocated by the transmission band are set as guard subcarriers. The frequency domain resources on the transmission band include $N_{symb}^{subframe}=14$ OFDM symbols. The reference signal block occupies the fourteenth OFDM symbol. The data block occupies the first to thirteenth OFDM symbols.

Figure 7:
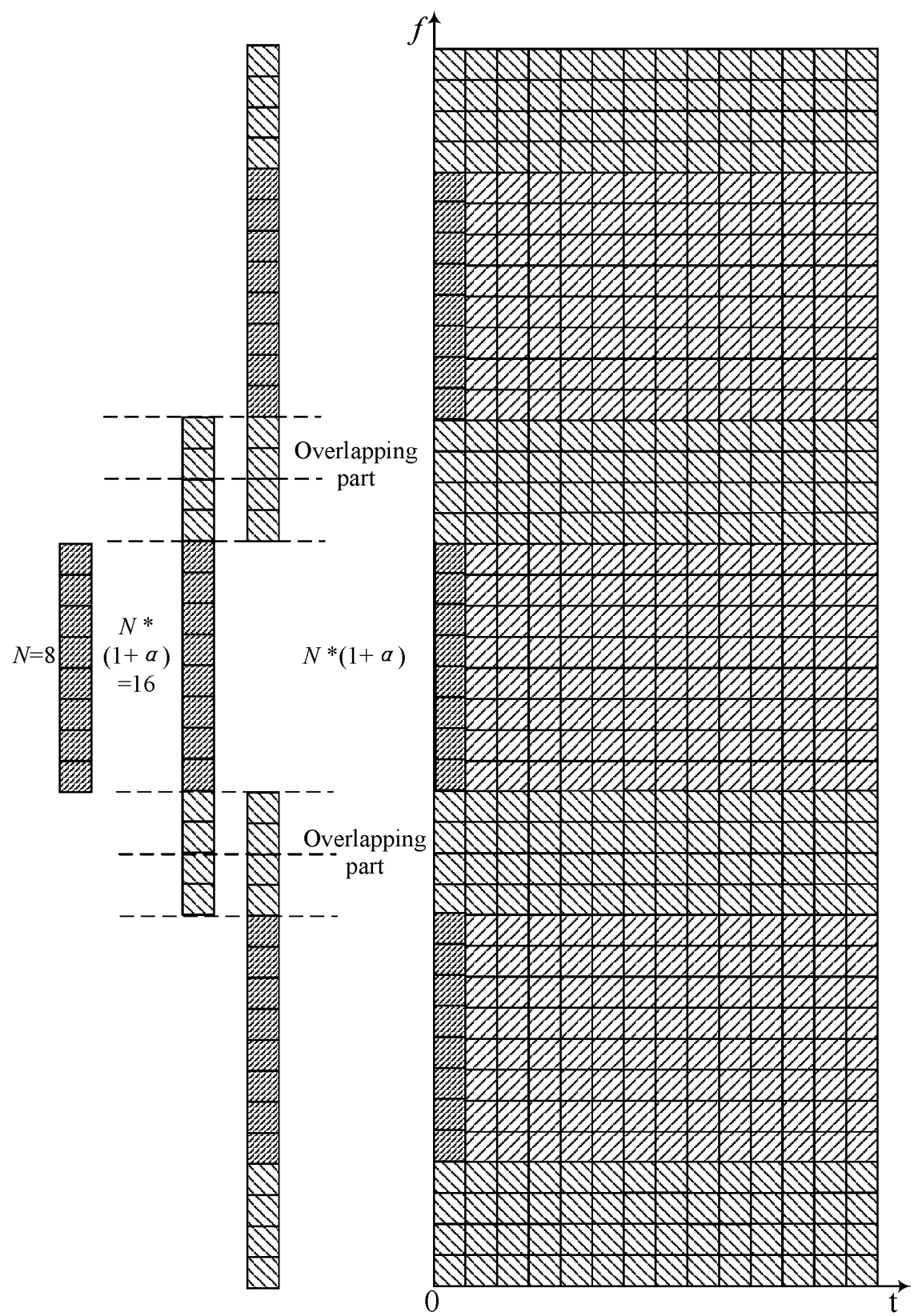
FIG. 7 is another diagram of allocation of frequency domain resources according to an embodiment of the present application.

In an embodiment, FIG. 7 is another diagram of allocation of frequency domain resources according to an embodiment of the present application. As shown in FIG. 7, assuming that the length of a reference signal sequence is N (N=8) and a roll-off factor of a frequency domain filter is $\alpha=1$, frequency domain resources can be allocated for a transmission band through $N_{grid}^{size}=N\cdot(1+\alpha)/N_{SC}^{RB}$.

$N_{grid}^{size}$ denotes the number of resource blocks. $N_{SC}^{RB}$ denotes the number of subcarriers contained in each resource block. In this embodiment, the reference signal sequence is transmitted on the transmission band. A resource block contains 12 consecutive subcarriers in the frequency domain, that is, $N_{SC}^{RB}=12$.

In this embodiment, the number of resource blocks can be calculated as $N_{grid}^{size}=4/3$, that is, $N_{grid}^{size}$ is a non-integer. In this embodiment, a first threshold value T for determining whether the number of resource blocks is performed a ceiling operation or a floor operation is set to be 0.5 and $\lceil N_{grid}^{size} \rceil - N_{grid}^{size} > T$ is satisfied so that the transmission band allocates $\lfloor N_{grid}^{size} \rfloor N_{SC}^{RB} = 12$ subcarriers. The resource length of $\lfloor N_{grid}^{size} \rfloor N_{SC}^{RB}$ subcarriers is less than $N \cdot (1+\alpha)$, and signals of the transmission band in frequency domain partially overlap signals of other adjacent transmission bands. The frequency domain resources on the transmission band include $N_{symb}^{subframe} = 14$ OFDM symbols. The reference signal block occupies the first OFDM symbol. The data block occupies the second to fourteenth OFDM symbols.

Figure 8:
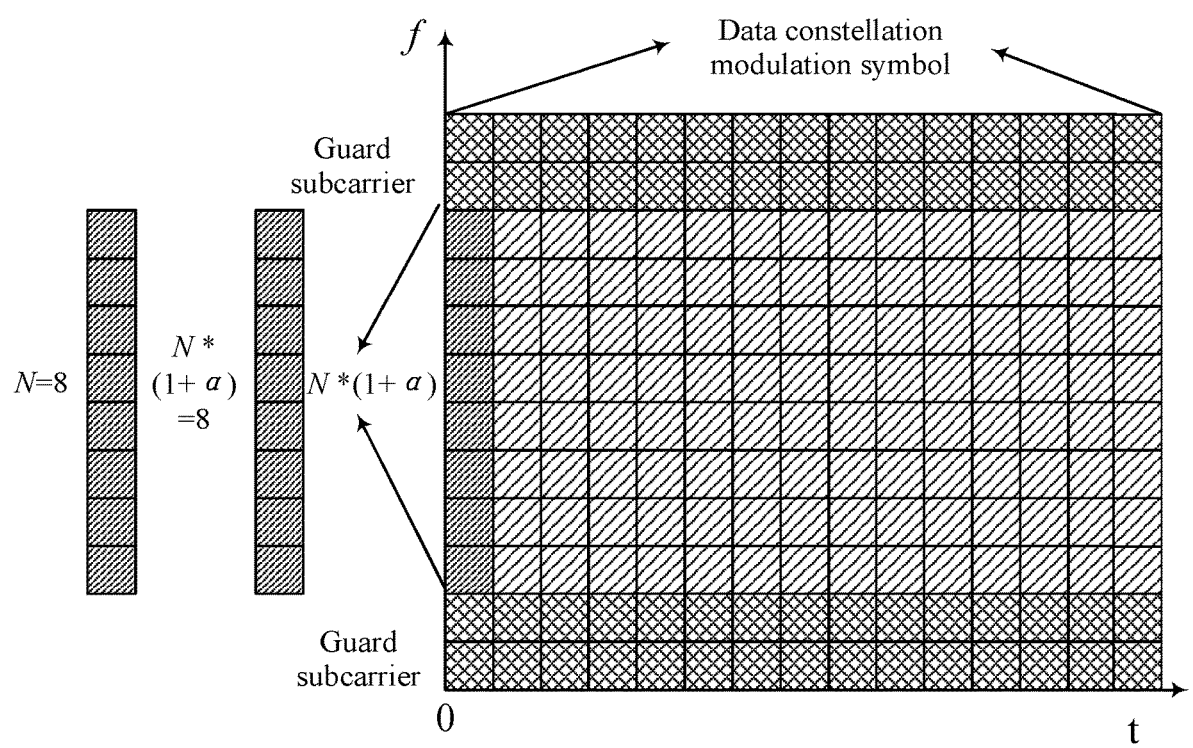
FIG. 8 is another diagram of allocation of frequency domain resources according to an embodiment of the present application.

In an embodiment, FIG. 8 is another diagram of allocation of frequency domain resources according to an embodiment of the present application. As shown in FIG. 8, assuming that the length of a reference signal sequence is N (N=8), the length of one data block (or OFDM symbol) is the same as the length N of the reference signal sequence, a roll-off factor of frequency domain filter is $\alpha = 0$, and frequency domain resources are allocated through the length N of the data block, that is, the frequency domain resources are allocated for a transmission band through $N_{grid}^{size} = N \cdot (1+\alpha)/N_{SC}^{RB}$. $5_{grid}^{size}$ denotes the number of resource blocks. $N_{SC}^{RB}$ denotes the number of subcarriers contained in each resource block. The reference signal sequence is transmitted on the transmission band, and a reference signal block and a data block are allocated the same number of resource blocks. A resource block contains 12 consecutive subcarriers in the frequency domain, that is, $N_{SC}^{RB} = 12$. In this embodiment, the number of resource blocks can be calculated as $N_{grid}^{size} = 2/3$, that is, $N_{grid}^{size}$ is a non-integer.

In this embodiment, a first threshold value T for determining whether the number of resource blocks is performed a ceiling operation or a floor operation is set to be 0.5, and $\lceil N_{grid}^{size} \rceil - N_{grid}^{size} \leq T$ is satisfied so that the transmission band allocates $\lceil N_{grid}^{size} \rceil N_{SC}^{RB} = N_{SC}^{RB} = 12$ subcarriers. In this embodiment, a data block of length N includes a data constellation modulation symbol of length M and a reference signal modulation symbol of length S. The relationship of N=M+S is satisfied. In this embodiment, M>0, and S>0, that is, the data block not only contains the data constellation modulation symbol, but also is inserted with the reference signal modulation symbol.

In this embodiment, the frequency domain resources allocated by the transmission band include $\lfloor N_{grid}^{size} \rfloor N_{SC}^{RB} = 12$ subcarriers and $N_{symb}^{subframe} = 15$ OFDM symbols.

Figure 9:
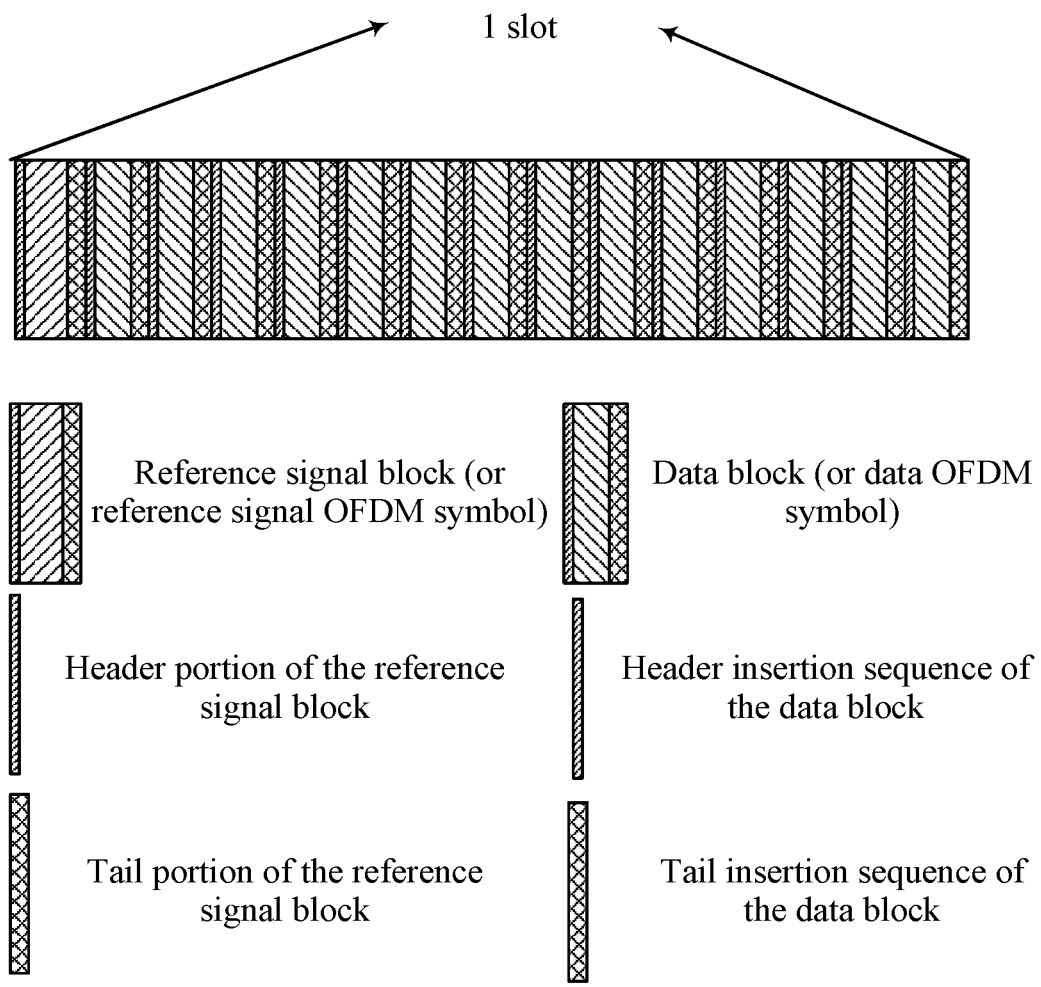
FIG. 9 is a diagram of allocation of time domain resources according to an embodiment of the present application.

FIG. 9 is a diagram of allocation of time domain resources according to an embodiment of the present application. As shown in FIG. 9, the first OFDM symbol configures a reference signal block, and the second to the fifteenth OFDM symbols configure data blocks. The reference signal modulation symbol in a data block is the same as the reference signal block. That is, the header insertion sequence of the data block is from the header portion of the reference signal block, the occupied resources are the same in size, and the contained contents are the same. The tail insertion sequence of the data block is from the tail portion of the reference signal block, the occupied resources are the same in size, and the contained contents are the same. As shown in FIG. 8, the resource length of $\lceil N_{grid}^{size} \rceil N_{SC}^{RB}$ subcarriers is greater than $N \cdot (1+\alpha)$, and the part of $\lceil N_{grid}^{size} \rceil N_{SC}^{RB}$ subcarriers whose resource length is greater than $N \cdot (1+\alpha)$ are set as guard subcarriers. That is, the reference signal block and the data block occupy the second to the ninth subcarriers of the frequency domain resources allocated by the transmission band. The zeroth subcarrier and the first subcarrier at the left edge of the frequency domain resources allocated by the transmission band are set as guard subcarriers. The tenth subcarrier and the eleventh subcarrier at the right edge of the frequency domain resources allocated by the transmission band are set as guard subcarriers.

Figure 10:
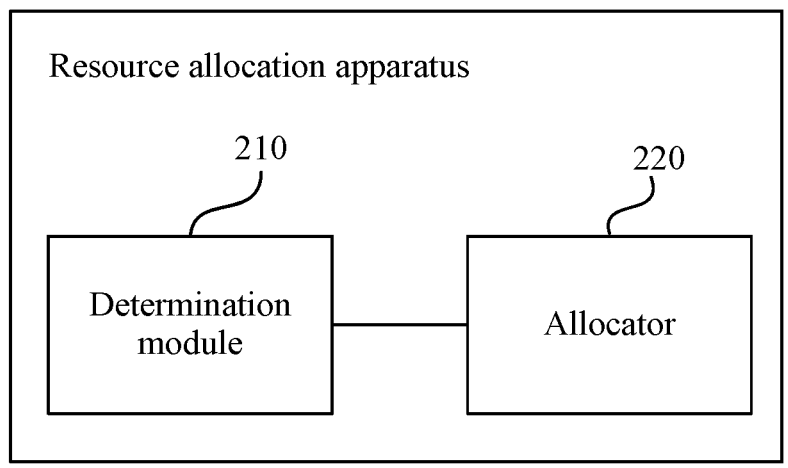
FIG. 10 is a block diagram illustrating the structure of a resource allocation apparatus according to an embodiment of the present application.

In an embodiment, FIG. 10 is a block diagram illustrating the structure of a resource allocation apparatus according to an embodiment of the present application. As shown in FIG. 10, this embodiment includes a determination module 210 and an allocator 220.

The determination module 210 is configured to determine the number of resource blocks according to the length of a reference signal sequence, a roll-off factor of a frequency domain filter, and the number of subcarriers contained in each resource block. The allocator 220 is configured to allocate frequency domain resources for a transmission band according to the number of resource blocks.

The resource allocation apparatus provided in this embodiment is configured to implement the resource allocation method in the embodiment shown in FIG. 1 and has similar implementation principles and technical effects. The details are not repeated here.

In an embodiment, the transmission band includes a reference signal block and a data block. The reference signal block and the data block are allocated the same number of resource blocks. The reference signal sequence is transmitted on the reference signal block or time domain resources of the transmission band. The transmission band is the entire transmission band or a sub-band in channel bandwidth in a communication system.

In an embodiment, the manner for determining the number of resource blocks includes determining the number of resource blocks according to the length of the data block, the roll-off factor of the frequency domain filter, and the number of subcarriers contained in each resource block.

In an embodiment, the length of a data block includes the length of a data constellation modulation symbol and the length of a reference signal modulation symbol. The length of the data block is equal to the sum of the length of the data constellation modulation symbol and the length of the reference signal modulation symbol. The length of the data constellation modulation symbol is less than or equal to the length of the data block and is greater than or equal to zero. The length of the reference signal modulation symbol is less than or equal to the length of the data block and is greater than or equal to zero.

In an embodiment, the number of resource blocks satisfies the following formula:

$$N_{grid}^{size} = N \cdot (1+\alpha)/N_{SC}^{RB}.$$

$N_{grid}^{size}$ denotes the number of resource blocks. $N_{SC}^{RB}$ denotes the number of subcarriers contained in each resource block. N denotes the length of the reference signal sequence. $\alpha$ denotes the roll-off factor of the frequency domain filter, and $0 \leq \alpha \leq 1$.

In an embodiment, the transmission band uses single-carrier type waveform modulation.

In an embodiment, single-carrier type waveform modulation includes a DFT operation or an FFT operation.

In an embodiment, single-carrier type waveform modulation includes DFT-s-OFDM waveform modulation or SC-FDMA waveform modulation.

In an embodiment, allocating frequency domain resources for the transmission band according to the number of resource blocks includes the following processes.

In the case where the number of resource blocks is an integer, a first preset number of subcarriers for the transmission band is allocated. The first preset number is the product value of the number of resource blocks and the number of subcarriers contained in each resource block.

In an embodiment, allocating frequency domain resources for the transmission band according to the number of resource blocks includes the following processes.

In the case where the number of resource blocks is a non-integer, a second preset number of subcarriers or a third preset number of subcarriers for the transmission band is allocated. The second preset number is the product value of the ceiling value of the number of resource blocks and the number of subcarriers contained in each resource block. The third preset number is the product value of the floor value of the number of resource blocks and the number of subcarriers contained in each resource block.

In an embodiment, in the case where the number of resource blocks is a non-integer, the resource allocation apparatus also includes a configurator. The configurator is configured to configure a first threshold value. The first threshold value is configured to determine whether to perform a ceiling operation or a floor operation on the number of resource blocks. The first threshold value is related to the modulation order of a data constellation modulation symbol.

In an embodiment, in the case where a fourth preset number is less than or equal to the first threshold value, the second preset number of subcarriers are allocated for the transmission band. In the case where the fourth preset number is greater than the first threshold value, the third preset number of subcarriers are allocated for the transmission band. The fourth preset number is the difference between the ceiling value of the number of resource blocks and the number of resource blocks.

In an embodiment, in the case where the second preset number of subcarriers are allocated for the transmission band and the resource length of the second preset number of subcarriers is greater than a first value, the part of the second preset number of subcarriers whose resource length is greater than the first value are set as guard subcarriers. The first value is a value determined according to the length of the reference signal sequence and the roll-off factor of the frequency domain filter.

In an embodiment, in the case where the third preset number of subcarriers are allocated for the transmission band and the resource length of the third preset number of subcarriers is less than a first value, the resource length that is greater than the third preset number of subcarriers in frequency domain of the transmission band is removed or zeroed.

In an embodiment, in the case where the third preset number of subcarriers are allocated for the transmission band and the resource length of the third preset number of subcarriers is less than a first value, signals of the transmission band in frequency domain partially overlap signals of an adjacent transmission band.

Figure 11:
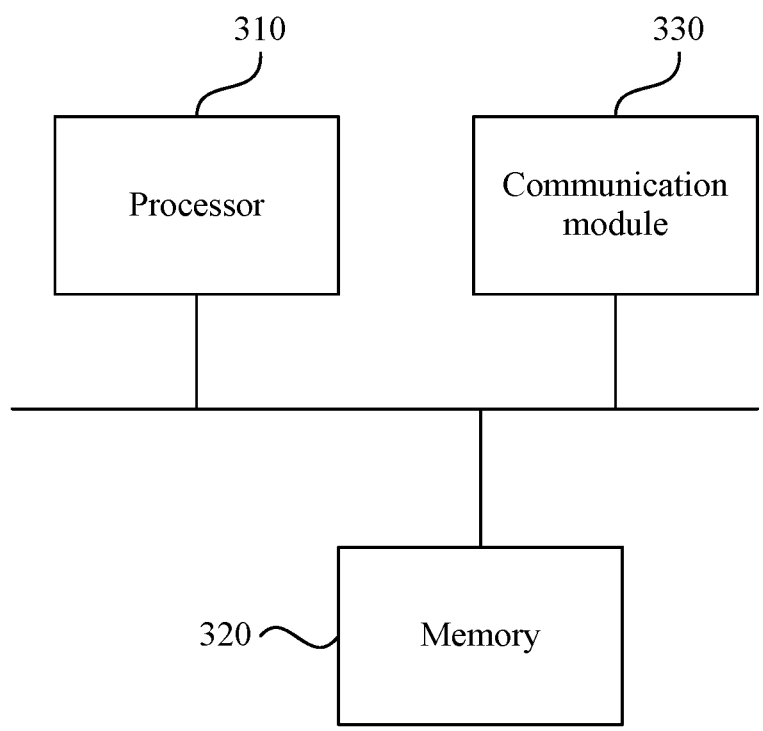
FIG. 11 is a diagram illustrating the structure of a device according to an embodiment of the present application.

FIG. 11 is a diagram illustrating the structure of a device according to an embodiment of the present application. As shown in FIG. 11, the device provided in the present application includes a processor 310, a memory 320, and a communication module 330. One or more processors 310 may be disposed in the device. FIG. 11 shows one processor 310 as an example. One or more memories 320 may be disposed in the device. FIG. 11 shows one memory 320 as an example. The processor 310, memory 320, and communication module 330 in the device may be connected by a bus or in other manners, and the connection by a bus is taken as an example in FIG. 11. In this embodiment, the device may be a client side (for example, a user equipment) or a network side (for example, a base station).

The memory 320, as a computer-readable storage medium, may be configured to store software programs, computer-executable programs, and modules, such as program instructions/modules corresponding to the device in any embodiment of the present application (for example, the determination module 210 and the allocator 220 in the resource allocation apparatus). The memory 320 may include a program storage region and a data storage region, where the program storage region may store an operating system and an application program required by at least one function, and the data storage region may store data created depending on the use of the device. Additionally, the memory 320 may include a high-speed random-access memory and may also include a nonvolatile memory such as at least one disk memory, a flash memory, or another nonvolatile solid-state memory. In some examples, the memory 320 may include memories which are remotely disposed relative to the processor 310, and these remote memories may be connected to the device via a network. Examples of the preceding network include, but are not limited to, the Internet, an intranet, a local area network, a mobile communication network, and a combination thereof.

The communication module 330 is configured to perform communication interaction with other synchronization nodes.

The preceding device may be configured to execute the resource allocation method provided by any preceding embodiment and has corresponding functions and effects.

An embodiment of the present application provides a storage medium containing a computer-executable instruction. The computer-executable instruction, when executed by a computer processor, is configured to execute a resource allocation method. The method includes determining the number of resource blocks according to the length of a reference signal sequence, a roll-off factor of a frequency domain filter, and the number of subcarriers contained in each resource block and allocating frequency domain resources for a transmission band according to the number of resource blocks.

The term user equipment encompasses any suitable type of wireless user equipment, such as a mobile phone, a portable data processing apparatus, a portable web browser, or a vehicle-mounted mobile station.

In general, multiple embodiments of the present application may be implemented in hardware, dedicated circuits, software, logics, or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program processes, may represent interconnected logic circuits, modules, and functions, or may represent a combination of program processes with logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory device and system (digital video disc (DVD) or compact disc (CD)). A computer-readable medium may include a non-transitory storage medium. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A resource allocation method, comprising:
   determining a number of resource blocks according to a length of a reference signal sequence, a roll-off factor of a frequency domain filter, and a number of subcarriers contained in each resource block; and
   allocating frequency domain resources for a transmission band according to the number of resource blocks;
   wherein the number of resource blocks satisfies a following formula:

$$N_{grid}^{size} = N \cdot (1+\alpha)/N_{SC}^{RB}$$

$N_{grid}^{size}$ denotes the number of resource blocks, $N_{SC}^{RB}$ denotes the number of subcarriers contained in each resource block, N denotes the length of the reference signal sequence, a denotes the roll-off factor of the frequency domain filter, and $0 \leq \alpha \leq 1$.

2. The method according to claim 1, wherein the transmission band comprises a reference signal block and a data block; wherein
   the reference signal block and the data block are allocated a same number of resource blocks;
   the reference signal sequence is transmitted on the reference signal block or a time domain resource of the transmission band; and
   the transmission band is an entire transmission band or a sub-band in channel bandwidth in a communication system.

3. The method according to claim 2, wherein the length of the reference signal sequence is the same as a length of the data block.

4. The method according to claim 2, wherein a length of the data block comprises a length of a data constellation modulation symbol and a length of a reference signal modulation symbol,
   wherein the length of the data block is equal to a sum of a length of the data constellation modulation symbol and a length of the reference signal modulation symbol,
   wherein the length of the data constellation modulation symbol is less than or equal to the length of the data block and is greater than or equal to zero, and the length of the reference signal modulation symbol is less than or equal to the length of the data block and is greater than or equal to zero.

5. The method according to claim 1, wherein the transmission band uses single-carrier type waveform modulation.

6. The method according to claim 5, wherein the single-carrier type waveform modulation comprises:
   a discrete Fourier transform (DFT) operation; or
   a fast Fourier transform (FFT) operation.

7. The method according to claim 5, wherein the single-carrier type waveform modulation comprises:
   discrete Fourier transform spread orthogonal frequency-division multiplexing (DFT-s-OFDM) waveform modulation; or
   single-carrier frequency-division multiple access (SC-FDMA) waveform modulation.

8. The method according to claim 1, wherein allocating the frequency domain resources for the transmission band according to the number of resource blocks comprises:
   in a case where the number of resource blocks is an integer, allocating a first preset number of subcarriers for the transmission band, wherein the first preset number is a product value of the number of resource blocks and the number of subcarriers contained in each resource block.

9. The method according to claim 1, wherein allocating the frequency domain resources for the transmission band according to the number of resource blocks comprises:
   in a case where the number of resource blocks is a non-integer, allocating a second preset number of subcarriers or a third preset number of subcarriers for the transmission band, wherein
   the second preset number is a product value of a ceiling value of the number of resource blocks and the number of subcarriers contained in each resource block, and
   the third preset number is a product value of a floor value of the number of resource blocks and the number of subcarriers contained in each resource block.

10. The method according to claim 9, in the case where the number of resource blocks is a non-integer, further comprising configuring a first threshold value, wherein
    the first threshold value is configured to determine whether to perform a ceiling operation or a floor operation on the number of resource blocks, and
    the first threshold value is related to a modulation order of a data constellation modulation symbol.

11. The method according to claim 10, further comprising:
    in a case where a fourth preset number is less than or equal to the first threshold value, allocating the second preset number of subcarriers for the transmission band;
    in a case where the fourth preset number is greater than the first threshold value, allocating the third preset number of subcarriers for the transmission band; and
    the fourth preset number is a difference between the ceiling value of the number of resource blocks and the number of resource blocks.

12. The method according to claim 9, further comprising:
    in a case where the second preset number of subcarriers are allocated for the transmission band and a resource length of the second preset number of subcarriers is greater than a first value, setting a part of the second preset number of subcarriers whose resource length is greater than the first value as guard subcarriers,
    wherein the first value is a value determined according to the length of the reference signal sequence and the roll-off factor of the frequency domain filter.

13. The method according to claim 9, further comprising:
    in a case where the third preset number of subcarriers are allocated for the transmission band and a resource length of the third preset number of subcarriers is less than a first value, removing or zeroing a resource length that is greater than the third preset number of subcarriers in frequency domain of the transmission band,
    wherein the first value is a value determined according to the length of the reference signal sequence and the roll-off factor of the frequency domain filter.

14. The method according to claim 9, wherein in a case where the third preset number of subcarriers are allocated for the transmission band and a resource length of the third preset number of subcarriers is less than a first value, signals of the transmission band in frequency domain partially overlaps signals of an adjacent transmission band, and the first value is a value determined according to the length of the reference signal sequence and the roll-off factor of the frequency domain filter.

15. A device, comprising a communication module, a memory, and at least one processor, wherein
the communication module is configured to perform communication interaction between at least two communication nodes;
the memory is configured to store at least one program; and
when executed by the at least one processor, the at least one program causes the at least one processor to implement:
determining a number of resource blocks according to a length of a reference signal sequence, a roll-off factor of a frequency domain filter, and a number of subcarriers contained in each resource block; and
allocating frequency domain resources for a transmission band according to the number of resource blocks;
wherein the number of resource blocks satisfies a following formula:

$$N_{grid}^{size}=N\cdot(1+\alpha)/N_{SC}^{RB},$$

$N_{grid}^{size}$ denotes the number of resource blocks, $N_{SC}^{RB}$ denotes the number of subcarriers contained in each resource block, N denotes the length of the reference signal sequence, a denotes the roll-off factor of the frequency domain filter, and $0 \leq \alpha \leq 1$.

16. A non-transitory storage medium storing a computer program which, when executed by a processor, implements:
determining a number of resource blocks according to a length of a reference signal sequence, a roll-off factor of a frequency domain filter, and a number of subcarriers contained in each resource block; and
allocating frequency domain resources for a transmission band according to the number of resource blocks;
wherein the number of resource blocks satisfies a following formula:

$$N_{grid}^{size}=N\cdot*1+\alpha)/N_{SC}^{RB},$$

$N_{grid}^{size}$ denotes the number of resource blocks, $N_{SC}^{RB}$ denotes the number of subcarriers contained in each resource block, N denotes the length of the reference signal sequence, a denotes the roll-off factor of the frequency domain filter, and $0 \leq \alpha \leq 1$.

17. The method according to claim 3, wherein the length of the data block comprises a length of a data constellation modulation symbol and a length of a reference signal modulation symbol,
wherein the length of the data block is equal to a sum of a length of the data constellation modulation symbol and a length of the reference signal modulation symbol,
wherein the length of the data constellation modulation symbol is less than or equal to the length of the data block and is greater than or equal to zero, and the length of the reference signal modulation symbol is less than or equal to the length of the data block and is greater than or equal to zero.

* * * * *